United States Patent [19]

Weaver et al.

[11] 4,039,522

[45] Aug. 2, 1977

[54] PHTHALIMIDYL-AZO-M-ACYLAMIDO-N-SUBSTITUTED ANILINE COMPOUNDS AND POLYESTER FIBERS DYED THEREWITH

[75] Inventors: Max A. Weaver; Jean C. Fleischer, both of Kingsport, Tenn.

[73] Assignee: Eastman Kodak Company, Rochester, N.Y.

[21] Appl. No.: 626,519

[22] Filed: Oct. 28, 1975

Related U.S. Application Data

[63] Continuation of Ser. No. 438,813, Feb. 1, 1974, abandoned, which is a continuation-in-part of Ser. No. 376,046, July 2, 1973, abandoned.

[51] Int. Cl.$^2$ .................... C09B 29/06; C09B 29/08; D06P 1/18; D06P 3/54
[52] U.S. Cl. .................... 260/152; 260/157; 260/158; 260/304 R; 260/326 R; 260/326 NS; 260/326 A; 260/326 HL; 260/326.5 E; 260/471 C; 260/465 D; 260/558 R; 260/562 R
[58] Field of Search .................... 260/158, 157, 152

[56] References Cited

U.S. PATENT DOCUMENTS 3,562,247  2/1971  Dehnert et al. .................... 260/152

FOREIGN PATENT DOCUMENTS 776,561    1/1968  Canada .................... 260/152
1,358,145  3/1964  France .................... 260/152

*Primary Examiner*—Floyd D. Higel
*Attorney, Agent, or Firm*—Donald W. Spurrell; Daniel B. Reece, III

[57] ABSTRACT

Monoazo compounds containing a N-substituted-3- or 4-phthalimidyl diazo component and certain m-acylamido-N-substituted aniline residue coupling components produce bright scarlet to red shades on fibers of, for example, polyester, polyamide and cellulose esters, and exhibit improved dyeability properties and good to excellent fastness to light, high pH, sublimation and crocking.

2 Claims, No Drawings

PHTHALIMIDYL-AZO-M-ACYLAMIDO-N-SUBSTITUTED ANILINE COMPOUNDS AND POLYESTER FIBERS DYED THEREWITH

This invention relates to certain novel disperse dye azo compounds and the use thereof and, more particularly, to certain phthalimidyl-azo-aniline compounds and textiles dyed therewith.

Our novel compounds have the general formula

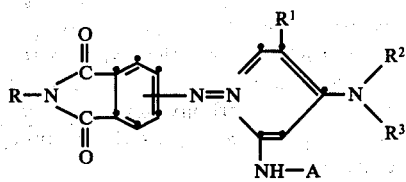

wherein
R is hydrogen, an organic radical having a molecular weight of not more than 200;
A is an organic acyl radical;
$R^1$ is hydrogen or lower alkyl;
$R^2$ individually is alkyl containing one to about eight carbon atoms; cyclohexyl; cyclohexyl substituted with lower alkyl; or lower alkyl substituted with lower alkoxy, aryl, aryloxy, cyclohexyl, cyano, lower alkanoyloxy, lower alkoxycarbonyl, lower alkoxycarbonyloxy, aroyloxy, lower alkylcarbamoyloxy, arylcarbamoyloxy, or a group having the formula

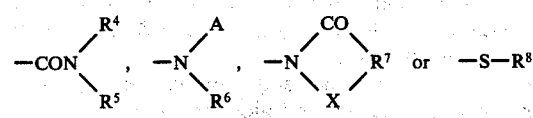

wherein
$R^4$ individually is hydrogen, lower alkyl or aryl;
$R^5$ individually is hydrogen or lower alkyl;
$R^4$ and $R^5$ collectively are $-(CH_2)_5-$ or $-CH_2CH_2OCH_2CH_2-$;
A is an acyl radical;
$R^6$ is hydrogen, lower alkyl, aryl, or cyclohexyl;
$R^7$ is ethylene, propylene, trimethylene, o-cyclohexylene, or o-arylene, or when X is $-CO-$, $R^7$ also can be $-NHCH_2-$, $-N(lower\ alkyl)CH_2-$, $-SCH_2-$, $-OCH_2-$, or $-CH_2OCH_2-$;
X is $-CH_2-$, $-CO-$, or $-SO_2-$; and
$R^8$ is aryl, benzyl, cyclohexyl, 1,2,4-triazol-3-yl, or 2-benzothiazolyl;
$R^3$ individually is hydrogen; lower alkyl; lower alkyl substituted with lower alkoxy, aryl, aryloxy, cyclohexyl, lower alkanoyloxy, lower alkoxycarbonyl or lower alkoxycarbonyloxy; allyl; or aryl; and
$R^2$ and $R^3$ in combination is a group having the formula $-CH_2CH_2-Y-CH_2CH_2-$ in which Y is $-CH_2-$, $-O-$, $-S-$, $-SO-$ or $-SO_2-$.

The disperse dye azo compounds of the invention produce bright scarlet to red shades on polyester and other fibers on which the compounds exhibit good fastness and dyeability properties. Our azo compounds, in general, exhibit good to excellent fastness to light, washing and sublimation. These dyes exhibit particularly excellent light fastness on nylon (polyamide) and cellulose acetate fibers. The fastness to sublimation and dyeability properties of our novel compounds will vary moderately depending on the substituents present on the structure of formula (I). Our compounds also exhibit good to excellent stability over a pH range of 4 to 8 when applied to texturized polyester fibers at elevated pressures at 250° to 265° F. The good dyeability properties of our compounds render them fast to crocking and result in good build-up and barre coverage. The unique combination of properties possessed by our novel compounds renders them superior to the compounds disclosed in Canadian Pat. No. 776,561, French Pat. No. 1,358,145, the *Indian Journal of Technology*, Vol. 9, pp. 175–178, and Offenlegungsschrift No. 2,164,198.

Our novel azo compounds are synthesized by diazotizing a 3- or 4-aminophthalimide having the formula

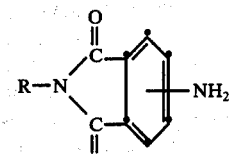

and coupling the resulting diazonium salt with a coupler having the formula

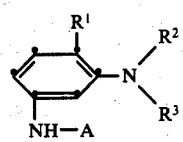

according to conventional techniques. The 3-aminophthalimides in which R is hydrogen, are prepared by reacting 3-nitrophthalic anhydride with ammonia followed by the reduction of the nitro group to the amino group whereas the analogous 4-amino compounds are prepared by reacting phthalic anhydride with ammonia followed by nitration and reduction. The corresponding aminophthalimide compounds in which R is a substituent are prepared by the mentioned techniques except that a primary amine is substituted for the ammonia. Alternatively, the aminophthalimide compounds in which R is a substituent can be prepared by reacting either phthalimide or a nitrophthalimide with an alkylating agent such as an aliphatic halide. The particular substituent represented by R is, in general, not critical. However, since our novel azo compounds are disperse dye compounds, substituent R is free of water-solubilizing groups such as sulfonate and carboxylate salt groups. The primary amines from which substituent R can be derived have the formula $R-NH_2$ in which R is an unsubstituted or substituted aliphatic, alicyclic, aromatic or heterocyclic residue having a molecular weight of not more than 200. In view of the vast number of primary amines and aliphatic halides which are known and/or can be synthesized by conventional procedures and since the substituent represented by R is not critical, no further elaboration on the groups represented by R is warranted. However, it is preferred that substituent R be devoid of amino groups, including unsubstituted and substituted amino groups, since such groups can affect detrimentally the synthesis of the azo compounds. The substituents described above in the definition of $R^2$ are typical of the groups which R can represent.

The couplers used in the synthesis of our novel azo compounds can be prepared by procedures well known in the art or by techniques analogous thereto. The specific groups encompassed by the generic language appearing in the definitions of A, $R^1$, $R^2$ and $R^3$ are well known or are chemically equivalent to groups disclosed in the prior art pertaining to disperse azo dyes. As used herein to describe a group containing an alkyl moiety, "lower" designates a carbon content of one to about four carbon atoms. Each aryl moiety of the aryl- and arylene-containing groups, e.g., aroyloxy, phthalimido, arylthio, etc., which our compounds can contain preferably is phenyl, phenylene, and phenyl and phenylene substituted with lower alkyl, lower alkoxy, lower alkoxycarbonyl or halogen such as a chlorine or bromine atom.

The organic acyl radicals represented by A preferably are formyl, lower alkanoyl, aroyl, cyclohexylcarbonyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, furoyl, etc. The alkanoyl groups can be substituted with substituents such as halogen, aryl, cyano, lower alkoxy, aryloxy, benzyloxy, lower alkylthio, lower alkylsulfonyl, etc. The alkylsulfonyl groups also can be substituted, for example, with cyano, hydroxy, halogen and the like. The alkoxycarbonyl groups can be substituted, for example, with hydroxy, alkoxy and cyano. Acetyl, propionyl, butyryl, cyanoacetyl, chloroacetyl, trifluoroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2cyanoethylsulfonyl, 2-hydroxyethylsulfonyl, and 2-chloroethylsulfonyl, are examples of the alkanoyl, alkoxycarbonyl and alkylsulfonyl groups which A can represent. Dimethylcarbamoyl, ethylcarbamoyl, propylcarbamoyl, butylcarbamoyl, phenylcarbamoyl and dimethylcarbamoyl are examples of the substituted carbamoyl groups. The unsubstituted and substituted alkanoyl, aroyl and alkoxycarbonyl groups are preferred.

The substituted alkyl groups represented by $R^2$ preferably are arylmethyl, arylethyl, cyclohexylmethyl, 2-cyanoethyl, or a group having the formula —Z—$R^9$ in which Z is ethylene, propylene, trimethylene, or tetramethylene and $R^9$ is any of the substituents, except aryl, cyano, and cyclohexyl, which can be present on the substituted alkyl groups represented by $R^2$ as defined above. Similarly, the preferred substituted alkyl groups represented by $R^3$ are arylmethyl, arylethyl, cyclohexylmethyl or a group having the formula —Z—$R^{10}$ in which Z is defined above and $R^{10}$ is any of the substituents, except aryl and cyclohexyl, which can be present on the substituted alkyl groups which $R^3$ can represent according to the above definitions thereof. It is also preferred that one of $R^1$ and $R^3$ is hydrogen.

A group of our compounds which are especially preferred because of their cost:performance ratio are those having the formula

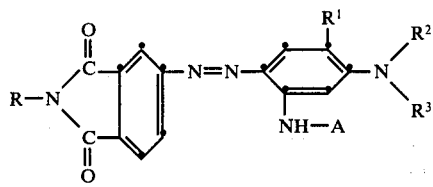

wherein

R is lower alkyl; arylmethyl; cyclohexylmethyl; 2-cyanoethyl; 2-carbamoylethyl; aryl; cyclohexyl; or the group —Z—$R^{11}$ in which Z is ethylene, propylene, or trimethylene and $R^{11}$ is succinimido, glutarimido, phthalimido, hydroxy, lower alkanoyloxy, 2-pyrrolidinono, or lower alkoxy;

A is lower alkanoyl, benzamido or lower alkoxycarbonyl;

$R^1$ is hydrogen or when $R^3$ is hydrogen, $R^1$ is methyl;

$R^2$ is lower alkyl; allyl; cyclohexyl; arylmethyl; cyclohexylmethyl; 2-cyanoethyl; 2-carbamoylethyl; N-lower alkyl-2-carbamoylethyl; N,N-di-lower alkyl-2-carbamoylethyl; or the group —Z—$R^{12}$ in which Z is ethylene, propylene or trimethylene and $R^{12}$ is lower alkanoyloxy, lower alkoxycarbonyl, lower alkoxycarbonyloxy, succinimido, glutarimido, phthalimido, aroyloxy, lower alkoxy or the group

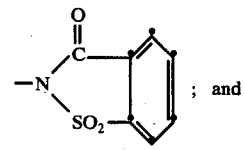 ; and $R^3$ is hydrogen; lower alkyl; cyclohexyl; arylmethyl; cyclohexylmethyl; or the group —Z—$R^{13}$ in which Z is ethylene, propylene or trimethylene and $R^{13}$ is lower alkanoyloxy, lower alkoxycarbonyl or lower alkoxycarbonyloxy;

in which each aryl moiety is phenyl, tolyl, anisyl, ethoxyphenyl or chlorophenyl. When $R^2$ and $R^3$ both represent substituents conforming to the formulas —Z—$R^{12}$ and —Z—$R^{13}$ the Z groups preferably are the same.

Our novel compounds and their synthesis and use are further illustrated by the following examples.

EXAMPLE 1

To 2-aminoethanol (12.2 g.) is added portionwise at 100°–125° C. 4-nitrophthalic anhydride (38.6 g.) with manual stirring. The mixture is heated gradually to 150° C. and kept at 150°–160° C. for 1 hr. with occasional stirring. The reaction mixture is cooled slightly and 50 ml. of ethanol is added. This solution is then drowned into 200 ml. of water. The product, N-(2-hydroxyethyl)-4-nitrophthalimide, is collected by filtration, washed with water and dried in air. It melts at 118°–119° C. and weighs 30.0 g.

EXAMPLE 2

N-(2-Hydroxyethyl)-4-nitrophthalimide (30.0 g.), ethanol (300 ml.), and Raney nickel (3.0 g.) are mixed and hydrogenated at 100° C. and 1500 psi. until hydrogen uptake ceases. The hot solution is filtered to remove the Raney nickel and the solvent evaporated to yield 4-amino-N-(2-hydroxyethyl)-phthalimide, the amine which melts at 171°–173° C.

EXAMPLE 3

A mixture of 4-nitrophthalimide (38.4 g.), iodoethane (46.8 g.), potassium carbonate (27.6 g.), and N,N-dimethylformamide (200 ml.) are heated and stirred at 95°–100° C. for 2 hr. An additional amount of iodoethane (46.8 g.) is added and the reaction mixture heated 4 hr. longer at 95°–100° C. The reaction mixture is drowned into 1500 ml. of water. The product, N-ethyl- 4-nitrophthalimide, is collected by filtration, washed with water and recrystallized from methanol. It melts at 113°-114° C.

EXAMPLE 4

N-Ethyl-4-nitrophthalimide (28.0 g.) is hydrogenated in 400 ml. of ethanol and in the presence of Raney nickel catalyst (10 g.) at 100° C. and 1500 psi. pressure. The reaction mixture is filtered to remove the catalyst and the filtrate is concentrated to yield the product, 4-amino-N-ethylphthalimide, which is recrystallized from methanol-water mixture. It melts at 169°-171° C.

EXAMPLE 5

3-Nitrophthalimide (30.0 g.) is ethylated with iodoethane in the same manner as the 4-nitro isomer (Example 3) to yield 35.4 g. of N-ethyl-3-nitrophthalimide melting at 102°-103° C.

EXAMPLE 6

N-Ethyl-nitrophthalimide (35.4 g.) is hydrogenated as in Example 4 to yield 22.5 g. of 3-amino-N-ethylphthalimide which melts at 134°-136° C.

EXAMPLES 7-14

Sodium nitrite (2.88 g.) is added gradually to 20 ml. of conc. $H_2SO_4$. The solution is cooled and 1:5 acid (1 part by volume propionic acid to 5 parts by volume acetic acid) (40 ml.) is added below 15° C. To this mixture is added 4-amino-N-ethylphthalimide (7.6 g., .04 mole), followed by 40 ml. of 1:5 acid, all below 5° C. The reaction mixture is stirred at 0°-5° C. for 2 hr. The following couplers (.005 mole) are dissolved in 25 ml. of 1:5 acid:

N,N-Diethyl-m-acetamidoaniline (Example 7)
N-Ethyl-N-n-propyl-m-acetamidoaniline (Example 8)
N-β-Acetoxyethyl-N-ethyl-m-acetamidoaniline (Example 9)
N,N-Di-β-acetoxyethyl-m-acetamidoaniline (Example 10)
N-β-Cyanoethyl-N-ethyl-m-acetamidoaniline (Example 11)
N-Ethyl-N-β-succinimidoethyl-m-acetamidoaniline (Example 12)
N-Benzyl-N-ethyl-m-acetamidoaniline (Example 13)
N-β-Acetoxyethyl-N-cyclohexyl-m-acetamidoaniline (Example 14)

To each chilled coupler solution is added a 0.005 mole aliquot of diazonium salt solution. The coupling mixtures are buffered by the addition of ammonium acetate and allowed to stand for 1 hr. The azo compound products are precipitated by the addition of water, collected by filtration, washed with water and dried in air. If needed, the azo products are purified by slurrying in hot methanol, cooling, filtering and washing with methanol.

The azo compounds set forth in the following table are prepared according to the synthesis techniques described herein and conform to formula (I). The structure of each of the azo compounds prepared in Examples 7-14, and the approximate shade each produces on polyester, polyamide and cellulose ester fibers, is indicated by Examples 7-14 of the Table. The phthalimidyl diazo component of the compounds of Examples 7-128 is bonded to the azo group at the 4-position, whereas the diazo component of the compounds of Examples 129-185 is bonded to the azo group at the 3-position.

TABLE

| Example No. | R | A | $R^1$ | $R^2$ | $R^3$ | Color |
|---|---|---|---|---|---|---|
| 7 | —$C_2H_5$ | —$COCH_3$ | H | —$C_2H_5$ | —$C_2H_5$ | Red |
| 8 | —$C_2H_5$ | —$COCH_3$ | H | —$C_2H_5$ | —$CH_2CH_2CH_3$ | Red |
| 9 | —$C_2H_5$ | —$COCH_3$ | H | —$CH_2CH_2OOCCH_3$ | —$C_2H_5$ | Scarlet |
| 10 | —$C_2H_5$ | —$COCH_3$ | H | —$CH_2CH_2OOCCH_3$ | —$CH_2CH_2OOCCH_3$ | Orange |
| 11 | —$C_2H_5$ | —$COCH_3$ | H | —$CH_2CH_2CN$ | —$C_2H_5$ | Red |
| 12 | —$C_2H_5$ | —$COCH_3$ | H | —$CH_2CH_2NCOCH_2CH_2CO$— (cyclic) | —$C_2H_5$ | Scarlet |
| 13 | —$C_2H_5$ | —$COCH_3$ | H | —$CH_2C_6H_5$ | —$C_2H_5$ | Scarlet |
| 14 | —$C_2H_5$ | —$COCH_3$ | H | —$C_6H_{11}$ | —$CH_2CH_2OOCCH_3$ | Scarlet |
| 15 | H | —$COCH_3$ | H | —$C_2H_5$ | —$CH_2CH_2CH_3$ | Red |
| 16 | H | —$COCH_3$ | H | —$C_2H_5$ | —$CH_2CH_2OOCCH_3$ | Scarlet |
| 17 | —$(CH_2)_3CH_3$ | —$COCH_3$ | H | —$C_2H_5$ | —$CH_2CH_2OOCCH_3$ | Scarlet |
| 18 | —$(CH_2)_3CH_3$ | —$COCH_3$ | H | —$C_2H_5$ | —$C_2H_5$ | Scarlet |
| 19 | —$(CH_2)_3CH_3$ | —$COCH_3$ | H | —$C_2H_5$ | —$CH_2C_6H_5$ | Scarlet |
| 20 | —$(CH_2)_3CH_3$ | —$COCH_3$ | H | —$CH_2CH_2S$—$C$=NNHCH=N (cyclic) | —$C_2H_5$ | Scarlet |
| 21 | —$CH_2C_6H_5$ | —$COCH_3$ | H | —$C_2H_5$ | —$CH_2CH_2OOCCH_3$ | Scarlet |
| 22 | —$CH_2C_6H_5$ | —$COCH_3$ | H | —$CH_2CH_2OOCCH_3$ | —$CH_2CH(CH_3)OOCCH_3$ | Orange |
| 23 | —$C_2H_5$ | —$COCH_3$ | H | —$C_2H_5$ | —$CH_2CH(CH_3)OOCCH_3$ | Scarlet |
| 24 | —$C_2H_5$ | —$COCH_3$ | H | —$CH_2CH_2CONH_2$ | —$C_2H_5$ | Scarlet |
| 25 | —$C_2H_5$ | —$COCH_3$ | H | —$C_6H_{11}$ | —$CH_2CH_2OOCCH_3$ | Red |
| 26 | —$C_2H_5$ | —$COCH_3$ | H | —$C_2H_5$ | —$CH_2CH=CH_2$ | Red |
| 27 | —$C_2H_5$ | —$COCH_3$ | H | —$CH_2CH_2NHCOCH_3$ | —$C_2H_5$ | Red |
| 28 | —$C_2H_5$ | —$COCH_3$ | H | —$CH_2CH_2NHCOC_6H_5$ | —$C_2H_5$ | Red |
| 29 | —$C_2H_5$ | —$COCH_3$ | H | —$CH_2CH_2NHCOOC_2H_5$ | —$C_2H_5$ | Red |
| 30 | —$C_2H_5$ | —$COCH_3$ | H | —$CH_2C_6H_5$ | —$CH_2CH_2OOCCH_3$ | Scarlet |
| 31 | —$C_2H_5$ | —$COCH_3$ | H | —$CH_2C_6H_{11}$ | —$CH_2CH_2OOCCH_3$ | Red |
| 32 | —$C_2H_5$ | —$COCH_3$ | —$CH_3$ | —$C_2H_5$ | H | Scarlet |
| 33 | —$C_2H_5$ | —$COCH_3$ | —$CH_3$ | —$CH(CH_3)C_2H_5$ | H | Scarlet |
| 34 | —$C_2H_5$ | —$COCH_3$ | —$CH_3$ | —$C_6H_{11}$ | H | Scarlet |
| 35 | —$C_2H_5$ | —$COCH_3$ | —$CH_3$ | —$CH_2C_6H_5$ | H | Scarlet |
| 36 | —$C_2H_5$ | —$COCH_3$ | —$CH_3$ | —$CH_2CH_2CN$ | H | Orange |
| 37 | —$C_2H_5$ | —$COCH_3$ | —$CH_3$ | —$CH_2CH_2OOCCH_3$ | H | Orange |
| 38 | —$CH_2C_6H_{11}$ | —$COCH_3$ | H | —$C_2H_5$ | —$CH_2CH_2OOCCH_3$ | Scarlet |
| 39 | —$CH_2C_6H_{11}$ | —$COCH_3$ | H | —$C_2H_5$ | —$CH_2CH_2CH_3$ | Scarlet |
| 40 | —$C_6H_{11}$ | —$COCH_3$ | H | —$C_2H_5$ | —$CH_2CH_2CH_3$ | Scarlet |
| 41 | —$C_6H_{11}$ | —$COCH_3$ | H | —$C_2H_5$ | —$CH_2CH_2OOCCH_3$ | Scarlet |
| 42 | —$C_6H_5$ | —$COCH_3$ | H | —$C_2H_5$ | —$CH_2CH_2OOCCH_3$ | Scarlet |
| 43 | —$C_6H_5$ | —$COCH_3$ | H | —$C_6H_{11}$ | —$CH_2CH_2OOCCH_3$ | Red |
| 44 | —$C_6H_5$ | —$COCH_3$ | H | —$CH_2C_6H_{11}$ | —$C_2H_5$ | Scarlet |

TABLE-continued

| Example No. | R | A | R¹ | R² | R³ | Color |
|---|---|---|---|---|---|---|
| 45 | —(CH₃)₃OCH₃ | —COCH₃ | H | —C₂H₅ | —C₂H₅ | Red |
| 46 | —(CH₃)₃OCH₃ | —COCH₃ | H | —CH₂CH₂NCOCH₂CH₂CO⌐ | —C₂H₅ | Scarlet |
| 47 | —CH₂CH₂OOCCH₃ | —COCH₃ | H | —CH₂CH₂CH₃ | —C₂H₅ | Red |
| 48 | —CH₂CH₂OOCCH₃ | —COCH₃ | H | —C₆H₁₁ | —CH₂CH₂CH₃ | Red |
| 49 | —CH₂CH₂OH | —COCH₃ | H | —C₂H₅ | —CH₂CH₂CH₃ | Red |
| 50 | —CH₂CH₂N(CH₂)₃CO⌐ | —COCH₃ | H | —C₂H₅ | —CH₂CH₂CH₃ | Red |
| 51 | —CH₂CH₂N(CH₂)₃CO⌐ | —COCH₃ | H | —C₆H₁₁ | —C₂H₅ | Red |
| 52 | —CH₂CH₂NHCOCH₃ | —COCH₃ | H | —C₂H₅ | —CH₂CH₂OOCCH₃ | Red |
| 53 | —CH₂C₆H₄-p—OCH₃ | —COCH₃ | H | —C₂H₅ | —CH₂CH₂OOCCH₃ | Scarlet |
| 54 | —CH₂CH₂C₆H₅ | —COCH₃ | H | —C₂H₅ | —CH₂CH₂OOCCH₃ | Scarlet |
| 55 | —CH₂CH₂CONH₂ | —COCH₃ | H | —C₂H₅ | —CH₂CH₂OOCCH₃ | Scarlet |
| 56 | —CH₂CH₂CN | —COCH₃ | H | —C₂H₅ | —CH₂CH₂OOCCH₃ | Scarlet |
| 57 | —CH₂CH₂NCOCH₂C⌐ | —COCH₃ | H | —C₂H₅ | —C₂H₅ | Red |
| 58 | —CH₂CH₂Cl | —COCH₃ | H | —C₂H₅ | —C₂H₅ | Red |
| 59 | —CH₂CH₂SO₂C₆H₅ | —COCH₃ | H | —C₂H₅ | —C₂H₅ | Red |
| 60 | —CH₂CH₂NHSO₂CH₃ | —COCH₃ | H | —C₂H₅ | —C₂H₅ | Red |
| 61 | —CH₂CH₂N(CH₃)SO₂CH₃ | —COCH₃ | H | —C₂H₅ | —C₂H₅ | Red |
| 62 | —CHCH₂SO₂CH₂CH₂⌐ | —COCH₃ | H | —C₂H₅ | —C₂H₅ | Red |
| 63 | —CHCH₂SO₂CH₂CH₂⌐ | —COC₂H₅ | H | —C₂H₅ | —CH₂CH₂OOCCH₃ | Scarlet |
| 64 | —C₆H₄-m—CH₃ | —COC₂H₅ | H | —C₂H₅ | —CH₂CH₂OOCCH₃ | Scarlet |
| 65 | —C₆H₄-m—Cl | —COC₂H₅ | H | —C₂H₅ | —CH₂CH₂OOCCH₃ | Scarlet |
| 66 | —C₆H₄-p—OCH₃ | —COC₂H₅ | H | —C₂H₅ | —CH₂CH₂OOCCH₃ | Scarlet |
| 67 | —CH₂CH₂COOCH₃ | —COC₂H₅ | H | —C₂H₅ | —CH₂CH₂OOCCH₃ | Scarlet |
| 68 | —CH₂CH₂NCO-o—C₆H₄CO⌐ | —COC₂H₅ | H | —C₂H₅ | —C₂H₅ | Red |
| 69 | CH₂CH₂NCO-o—C₆H₄SO₂⌐ | —COC₂H₅ | H | —C₂H₅ | —C₂H₅ | Red |
| 70 | —CH₂CH₂OOCC₆H₅ | —COC₂H₅ | H | —C₂H₅ | —C₂H₅ | Red |
| 71 | —CH₂CH₂OOCOC₂H₅ | —COC₂H₅ | H | —C₂H₅ | —C₂H₅ | Red |
| 72 | —CH₂CH₂OCH₂CH₂OH | —COC₂H₅ | H | —C₂H₅ | —C₂H₅ | Red |
| 73 | —CH₂CH₂NCH₂-o—C₆H₄CO⌐ | —COC₂H₅ | H | —C₂H₅ | —C₂H₅ | Red |
| 74 | —CH₂CH₂NCOCH₂HNCO⌐ | —COC₂H₅ | H | —C₂H₅ | —C₂H₅ | Red |
| 75 | —CH₂CH₂NCOCH₂OCH₂CO⌐ | —COC₂H₅ | H | —C₂H₅ | —C₂H₅ | Red |
| 76 | —CH₂CH₂OC₆H₅ | —COC₂H₅ | H | —C₂H₅ | —C₂H₅ | Red |
| 77 | —CH₂—C₆H₄-p—COOCH₃ | —COC₂H₅ | H | —C₂H₅ | —C₂H₅ | Red |
| 78 | —CH₂CH=CH₂ | —COC₂H₅ | H | —C₂H₅ | —C₂H₅ | Red |
| 79 | —CH(CH₃)C₂H₅ | —COC₂H₅ | H | —C₂H₅ | —C₂H₅ | Red |
| 80 | —CH₂COC₆H₅ | —COC₂H₅ | H | —C₂H₅ | —C₂H₅ | Red |
| 81 | —C₆H₄-p—SO₂CH₃ | —COC₂H₅ | H | —C₂H₆ | —C₂H₅ | Red |
| 82 | —C₆H₄-p—NHCOCH₃ | —COC₂H₅ | H | —C₂H₅ | —C₂H₅ | Red |
| 83 | —CH₂C₆H₁₀-p—CH₂OH | —COC₂H₅ | H | —C₂H₅ | —C₂H₅ | Red |
| 84 | —C₂H₅ | —COOC₂H₅ | H | —C₂H₅ | —C₂H₅ | Red |
| 85 | —C₂H₅ | —COOC₂H₅ | H | —CH₂C₆H₅ | —CH₂C₆H₅ | Scarlet |
| 86 | —C₂H₅ | —COC₆H₅ | H | —C₂H₅ | —C₂H₅ | Red |
| 87 | —C₂H₅ | —COC₆H₅ | H | —C₂H₅ | —CH₂CH₂OOCCH₃ | Red |
| 88 | —C₂H₅ | —COC₆H₁₁ | H | —C₂H₅ | —CH₂CH₂OOCCH₃ | Red |
| 89 | —C₂H₅ | —COC₆H₅ | CH₃ | H | —CH₂(CH₃)C₂H₅ | Red |
| 90 | —C₂H₅ | —COCH₂OH | H | —C₂H₅ | —C₂H₅ | Red |
| 91 | —C₂H₅ | —COCH₂Cl | H | —C₂H₅ | —C₂H₅ | Red |
| 92 | —C₂H₅ | —COCH₂OCH₃ | H | —C₂H₅ | —C₂H₅ | Red |
| 93 | —C₂H₅ | —COCH₂CH₂Cl | H | —C₂H₅ | —C₂H₅ | Red |
| 94 | —C₂H₅ | —COCH₂OC₆H₅ | H | —C₂H₅ | —C₂H₅ | Red |
| 95 | —C₂H₅ | —COCH₂C₆H₅ | H | —C₂H₅ | —C₂H₅ | Red |
| 96 | —C₂H₅ | —SO₂CH₃ | H | —C₂H₅ | —C₂H₅ | Red |
| 97 | —C₂H₅ | —COCH₂CH₂CN | H | —C₂H₅ | —C₂H₅ | Red |
| 98 | —C₂H₅ | —CONHC₆H₅ | H | —C₂H₅ | —C₂H₅ | Red |
| 99 | —C₂H₅ | —CONHC₆H₅ | H | —C₂H₅ | —C₂H₅ | Red |
| 100 | —C₂H₅ | —COCH₂OOCCH₃ | H | —C₂H₅ | —C₂H₅ | Red |
| 101 | —C₂H₅ | —COCH₃ | H | —CH₂CH₂NCO-o—C₆H₄CO⌐ | —C₂H₅ | Scarlet |

TABLE-continued

| Example No. | R | A | R$^1$ | R$^2$ | R$^3$ | Color |
|---|---|---|---|---|---|---|
| 102 | —C$_2$H$_5$ | —COCH$_3$ | H |  | —C$_2$H$_5$ | Scarlet |
|  |  |  |  | —CH$_2$CH$_2$NCOCH$_2$NHCO |  |  |
| 103 | —C$_2$H$_5$ | —COCH$_3$ | H | —CH$_2$CH$_2$N(CH$_3$)SO$_2$CH$_3$ | —C$_2$H$_5$ | Scarlet |
| 104 | —C$_2$H$_5$ | —COCH$_3$ | H | —CH$_2$CH$_2$N(C$_2$H$_5$)SO$_2$C$_6$H$_5$ | —C$_2$H$_5$ | Scarlet |
| 105 | —C$_2$H$_5$ | —COCH$_3$ | H |  | —C$_2$H$_5$ | Scarlet |
|  |  |  |  | —CH$_2$CH$_2$NCO-o — C$_6$H$_4$SO$_2$ |  |  |
| 106 | —C$_2$H$_5$ | —COCH$_3$ | H | —CH$_2$CH$_2$NH(C$_6$H$_5$)SO$_2$CH$_3$ | —C$_2$H$_5$ | Scarlet |
| 107 | —C$_2$H$_5$ | —COCH$_3$ | H | —CH$_2$CH$_2$—SO$_2$—CH$_2$CH$_2$— |  | Orange |
| 108 | —C$_2$H$_5$ | —COCH$_3$ | H | —CH$_2$CH$_2$OCH$_2$CH$_2$— |  | Scarlet |
| 109 | —C$_2$H$_5$ | —COCH$_3$ | H | —(CH$_2$)$_5$— |  | Red |
| 110 | —C$_2$H$_5$ | —COCH$_3$ | H | —CH$_2$CH$_2$N(SO$_2$CH$_3$)CH$_2$CH$_2$— |  | Scarlet |
| 111 | —C$_2$H$_5$ | —COCH$_3$ | H | —CH$_2$—C$_6$H$_4$-p—COOCH$_3$ | —C$_2$H$_5$ | Scarlet |
| 112 | —C$_2$H$_5$ | —COCH$_3$ | H | —CH$_2$CH(OOCH$_3$)CH$_2$OOCH$_3$ | —C$_2$H$_5$ | Scarlet |
| 113 | —C$_2$H$_5$ | —COCH$_3$ | H | —CH$_2$CH(OOCH$_3$)CH$_2$Cl | —C$_2$H$_5$ | Scarlet |
| 114 | —C$_2$H$_5$ | —COCH$_3$ | H | —CH$_2$CH$_2$OC$_2$H$_5$ | —C$_2$H$_5$ | Scarlet |
| 115 | —C$_2$H$_5$ | —COCH$_3$ | H | —CH$_2$CH$_2$OOCC$_6$H$_5$ | —C$_2$H$_5$ | Scarlet |
| 116 | —C$_2$H$_5$ | —COCH$_3$ | H | —CH$_2$CH$_2$OOCCH$_2$OC$_6$H$_5$ | —C$_2$H$_5$ | Scarlet |
| 117 | —C$_2$H$_5$ | —COCH$_3$ | H | —CH$_2$CH$_2$OOCCH$_2$C$_6$H$_5$ | —C$_2$H$_5$ | Scarlet |
| 118 | —C$_2$H$_5$ | —COCH$_3$ | H | —CH$_2$CH$_2$OOCH$_2$COCH$_3$ | —C$_2$H$_5$ | Scarlet |
| 119 | —C$_2$H$_5$ | —COCH$_3$ | H | —CH$_2$CH$_2$OOCCH$_2$CN | —C$_2$H$_5$ | Scarlet |
| 120 | —C$_2$H$_5$ | —COCH$_3$ | H | —CH$_2$CH$_2$OOCCH$_2$CH$_2$OCH$_3$ | —C$_2$H$_5$ | Scarlet |
| 121 | —C$_2$H$_5$ | —COCH$_3$ | H | —CH$_2$CH$_2$OOCCH$_2$CH$_2$COOC$_2$H$_5$ | —C$_2$H$_5$ | Scarlet |
| 122 | —C$_2$H$_5$ | —COCH$_3$ | H | —CH$_2$C$_6$H$_5$ | —CH$_2$C$_6$H$_4$-p—COOCH$_3$ | Orange |
| 123 | —C$_2$H$_5$ | —COCH$_3$ | H | —CH$_2$C$_6$H$_{11}$ | —CH$_2$C$_6$H$_4$-p—COOCH$_3$ | Orange |
| 124 | —C$_2$H$_5$ | —COCH$_3$ | H | —CH$_2$C$_6$H$_5$ | —C$_6$H$_{11}$ | Scarlet |
| 125 | —C$_2$H$_5$ | —COCH$_3$ | H | —CH$_2$C$_6$H$_{11}$ | —CH$_2$C$_6$H$_{11}$ | Red |
| 126 | —C$_2$H$_5$ | —COCH$_3$ | H | —CH$_2$C$_6$H$_{11}$ | —CH$_2$CH$_2$CONHCH(CH$_3$)$_2$ | Red |
| 127 | —C$_2$H$_5$ | —COCH$_3$ | H | —C$_6$H$_{11}$ | —CH$_2$CH$_2$OOCOC$_2$H$_5$ | Red |
| 128 | —C$_2$H$_5$ | —COCH$_3$ | H | —C$_6$H$_{11}$ | —CH$_2$CH$_2$CN | Red |
| 129 | —C$_2$H$_5$ | —NHCOCH$_3$ | H | —C$_2$H$_5$ | —CH$_2$CH$_2$CH$_3$ | Scarlet |
| 130 | —C$_2$H$_5$ | —COCH$_3$ | H | —C$_6$H$_{11}$ | —C$_2$H$_5$ | Scarlet |
| 131 | —C$_2$H$_5$ | —COCH$_3$ | H | —CH$_2$C$_6$H$_5$ | —C$_2$H$_5$ | Orange |
| 132 | —C$_2$H$_5$ | —COCH$_3$ | H | —CH$_2$CH$_2$OOCCH$_3$ | —C$_2$H$_5$ | Orange |
| 133 | —C$_2$H$_5$ | —COCH$_3$ | H |  | —C$_2$H$_5$ | Orange |
|  |  |  |  | —CH$_2$CH$_2$NCO(CH$_2$)$_3$CO |  |  |
| 134 | —C$_2$H$_5$ | —COCH$_3$ | H | —CH$_2$CH$_2$OOCCH$_3$ | —CH$_2$CH$_2$OOCCH$_3$ | Orange |
| 135 | —C$_2$H$_5$ | —COCH$_3$ | H | —CH$_2$CH(C$_2$H$_5$)(CH$_2$)$_3$CH$_3$ | —C$_2$H$_5$ | Scarlet |
| 136 | —C$_2$H$_5$ | —COCH$_3$ | H | —CH$_2$CH$_2$NHCOCH$_3$ | —C$_2$H$_5$ | Scarlet |
| 137 | —C$_2$H$_5$ | —COCH$_3$ | —CH$_3$ | —C$_2$H$_5$ | H | Orange |
| 138 | —C$_2$H$_5$ | —COCH$_3$ | —CH$_3$ | —CH$_2$C$_6$H$_5$ | H | Orange |
| 139 | —C$_2$H$_5$ | —COCH$_3$ | —CH$_3$ | —C$_6$H$_{11}$ | H | Orange |
| 140 | —C$_2$H$_5$ | —COCH$_3$ | H | —CH$_2$CH$_2$OOCC$_6$H$_5$ | —(CH$_2$)$_3$CH$_3$ | Orange |
| 141 | —C$_2$H$_5$ | —COCH$_3$ | H | —CH$_2$CH$_2$OOCOC$_2$H$_5$ | —CH$_2$CH(CH$_3$)$_2$ | Orange |
| 142 | —C$_2$H$_5$ | —COCH$_3$ | H | —C$_6$H$_{11}$ | —CH$_2$CH(OOCCH$_3$)CH$_3$ | Scarlet |
| 143 | —C$_2$H$_5$ | —COCH$_3$ | H | —C$_6$H$_{11}$ | —CH$_2$C$_6$H$_5$ | Scarlet |
| 144 | —C$_2$H$_5$ | —COCH$_3$ | H | —CH$_2$CH(OOCCH$_3$)CH$_2$OOCCH$_3$ | —C$_2$H$_5$ | Orange |
| 145 | —C$_2$H$_5$ | —COC$_6$H$_5$ | —CH$_3$ | —CH(CH$_3$)C$_2$H$_5$ | H | Orange |
| 146 | —C$_2$H$_5$ | —COC$_6$H$_5$ | H | —CH$_2$CH(CH$_3$)$_2$ | —CH$_2$CH$_2$CH$_3$ | Scarlet |
| 147 | —C$_2$H$_5$ | —COC$_2$H$_5$ | H | —CH$_2$C$_6$H$_4$-p—COOCH$_3$ | —CH$_2$CH$_2$CH$_3$ | Orange |
| 148 | —C$_2$H$_5$ | —COC$_2$H$_5$ | H | —CH$_2$C$_6$H$_{11}$ | —CH$_2$CH$_2$OOCH$_3$ | Orange |
| 149 | —C$_2$H$_5$ | —COC$_2$H$_5$ | H | —CH$_2$CH$_2$CN | —C$_2$H$_5$ | Orange |
| 150 | —C$_2$H$_5$ | —COC$_2$H$_5$ | H | —CH$_2$CH$_2$CONH$_2$ | —C$_2$H$_5$ | Orange |
| 151 | —C$_2$H$_5$ | —COC$_2$H$_5$ | H | —CH$_2$CH$_2$CONHCH(CH$_3$)$_2$ | —C$_2$H$_5$ | Orange |
| 152 | —C$_2$H$_5$ | —COC$_2$H$_5$ | H | —CH$_2$CH$_2$OC$_6$H$_5$ | —C$_2$H$_5$ | Orange |
| 153 | —CH(CH$_3$)$_2$ | —COCH(CH$_3$)$_2$ | H | —C$_2$H$_5$ | —C$_2$H$_5$ | Scarlet |
| 154 | —(CH$_2$)$_3$CH$_3$ | —COOC$_2$H$_5$ | H | —C$_2$H$_5$ | —C$_2$H$_5$ | Scarlet |
| 155 | —CH$_2$C$_6$H$_5$ | —COCH$_3$ | H | —C$_2$H$_5$ | —C$_2$H$_5$ | Scarlet |
| 156 | —C$_6$H$_{11}$ | —COCH$_3$ | H | —C$_2$H$_5$ | —C$_2$H$_5$ | Scarlet |
| 157 | —(CH$_2$)$_3$OCH$_3$ | —COCH$_3$ | H | —C$_2$H$_5$ | —C$_2$H$_5$ | Scarlet |
| 158 | —CH$_2$CH$_2$OH | —COCH$_3$ | H | —C$_2$H$_5$ | —C$_2$H$_5$ | Scarlet |
| 159 | —CH$_2$CH$_2$OOCCH$_3$ | —COCH$_3$ | H | —C$_2$H$_5$ | —C$_2$H$_5$ | Scarlet |
| 160 | —CH$_2$CH$_2$ | —COCH$_3$ | H | —C$_2$H$_5$ | —C$_2$H$_5$ | Scarlet |
|  | NCOCH$_2$CH$_2$CO |  |  |  |  |  |
| 161 | —CH$_2$CH$_2$C$_6$H$_4$-p—COOCH$_3$ | —COCH$_3$ | H | —C$_2$H$_5$ | —C$_2$H$_5$ | Scarlet |
| 162 | H | —COCH$_3$ | H | —C$_2$H$_5$ | —C$_2$H$_5$ | Scarlet |
| 163 |  | —COCH$_3$ | H | —C$_2$H$_5$ | —C$_2$H$_5$ | Scarlet |
|  | —CHCH$_2$SO$_2$CH$_2$CH$_2$ |  |  |  |  |  |
| 164 | —CH$_2$CH=CH$_2$ | —COCH$_3$ | H | —C$_2$H$_5$ | —C$_2$H$_5$ | Scarlet |
| 165 | —CH$_2$CH(C$_2$H$_5$)(CH$_2$)$_3$CH$_3$ | —COCH$_2$OH | H | —C$_2$H$_5$ | —C$_2$H$_5$ | Scarlet |
| 166 | —CH$_2$CH$_2$CH$_3$ | —COC$_6$H$_5$ | H | —C$_2$H$_5$ | —C$_2$H$_5$ | Scarlet |
| 167 | —CH$_2$CH(CH$_3$)$_2$ | —COC$_6$H$_{11}$ | H | —C$_2$H$_5$ | —C$_2$H$_5$ | Scarlet |
| 168 | —CH$_2$CH(CH$_3$)$_2$ | —COCH$_2$OC$_6$H$_5$ | H | —C$_2$H$_5$ | —C$_2$H$_5$ | Scarlet |
| 169 | —CH$_2$CH(CH$_3$)$_2$ | —COC$_6$H$_4$-p—COOCH$_3$ | H | —C$_2$H$_5$ | —C$_2$H$_5$ | Scarlet |
| 170 | —CH$_2$CH(CH$_3$)$_2$ | —SO$_2$CH$_3$ | H | —C$_2$H$_5$ | —C$_2$H$_5$ | Scarlet |
| 171 | —CH$_2$CH(CH$_3$)$_2$ | —CONHC$_2$H$_5$ | H | —C$_2$H$_5$ | —C$_2$H$_5$ | Scarlet |
| 172 | —CH$_2$C$_6$H$_4$-p—Cl | —COOC$_2$H$_5$ | H | —C$_2$H$_5$ | —C$_2$H$_5$ | Scarlet |
| 173 | —C$_6$H$_4$-p—OCH$_3$ | —COCH$_2$CH$_2$OH | H | —C$_2$H$_5$ | —C$_2$H$_5$ | Scarlet |
| 174 | —C$_6$H$_4$-m—CH$_3$ | —COCH$_2$Cl | H | —C$_2$H$_5$ | —C$_2$H$_5$ | Scarlet |
| 175 | —C$_6$H$_4$-p—NHCOCH$_3$ | —COCH$_3$ | H | —C$_2$H$_5$ | —C$_2$H$_5$ | Scarlet |
| 176 | —C$_2$H$_5$ | —COCH$_3$ | H | —CH$_2$CH$_2$CN | —(CH$_2$)$_3$OOCCH$_3$ | Orange |

TABLE-continued

| Example No. | R | A | R¹ | R² | R³ | Color |
|---|---|---|---|---|---|---|
| 177 | —$C_2H_5$ | —$COCH_3$ | H | —$CH_2CH_2OOCCH_3$ | —$CH_2CH_2OOCCH_3$ | Orange |
| 178 | —$C_2H_5$ | —$COCH_3$ | H |  | —$CH_2CH_2SO_2CH_2CH_2$— | Orange |
| 179 | —$C_2H_5$ | —$COCH_3$ | H |  | —$CH_2CH_2OCH_2CH_2$— | Orange |
| 180 | —$C_2H_5$ | —$COCH_3$ | H | —$CH_2CH(OOCCH_3)CH_2Cl$ | —$C_2H_5$ | Orange |
| 181 | —$C_2H_5$ | —$COCH_3$ | H | —$CH_2CH_2C_6H_5$ | —$C_2H_5$ | Scarlet |
| 182 | —$C_2H_5$ | —$COCH_3$ | H | —$CH_2C_6H_{11}$ | —$C_2H_5$ | Scarlet |
| 183 | —$C_2H_5$ | —$COCH_3$ | H | —$CH_2C_6H_5$ | —$CH_2C_6H_5$ | Scarlet |
| 184 | —$C_2H_5$ | —$COCH_3$ | H | —$CH_2C_6H_{11}$ | —$CH_2C_6H_5$ | Scarlet |
| 185 | —$C_2H_5$ | —$COCH_3$ | H | —$CH_2C_6H_{10}$-p—$CH_3$ | —$CH_2CH_2CH_3$ | Scarlet |

The compounds of the invention can be applied to polyester by known disperse dyeing techniques employing carriers, surfactants, dispersing agents, etc. Dyeing can be conducted at atmospheric or superatmospheric pressures. The following example illustrates a dyeing procedure for applying the azo compounds of the invention to dye polyester textile materials at atmospheric pressure and at the boil:

EXAMPLE 186

An amount of 0.1 g. of the azo compound of Example 8 is dissolved in 10 cc. of 2-methoxyethanol. A small amount (3 to 5 cc.) of a 3% sodium lignin sulfonate aqueous solution is added, with stirring, and then the volume of the bath is brought to 300 cc. with water. 3 cc. of a chlorinated benzene emulsion carrier (Tanavol) is added to the bath and 10.0 g. of a textile fabric made of poly(ethylene terephthalate) fibers is placed in the bath and worked 10 min. without heat. The dyeing is carried out at the boil for 1 hur. The dyed fabric is removed from the dyebath and scoured for 20 min. at 80° C. in a solution containing 1 g./l. neutral soap and 1 g./l. sodium carbonate. The fabric is then rinsed, dried in an oven at 250° F. and heat set (for the removal of residual carrier) for 5 min. at 350° F. The fabric is dyed a bright shade of red and exhibits excellent fastness properties when tested according to conventional methods such as those described in the Technical Manual of the American Association of Textile Chemists and Colorists, 1968 edition.

The following example describes a method by which our compounds can be applied to texturized polyester fibers:

EXAMPLE 187

The azo compound of Example 12 (66.7 mg.) is dissolved/dispersed in 10 cc. of 2-methoxyethanol in a Launder-Ometer container to which is then added with stirring about 0.2 g. sodium lignin sulfonate and 0.2 g. of a surfactant (Igepon T-51) from a stock solution containing both components. The volume of the bath is brought to 300 ml. with water and 0.3 g. of a butyl benzoate emulsion carrier (DAC-888) is added. A fabric (10 g.) of texturized poly(ethylene terephthalate) fibers is wet out and placed in the bath which is then sealed and affixed to the rotating arm of a Launder-Ometer set at 120° F. After placing the containerbath in rotation the Launder-Ometer is set at 260° F. and after the heating medium reaches that temperature, dyeing with rotation is continued for 1½ hours. After allowing the container-bath to cool, the dyed fabric is removed, rinsed with water and dried. If necessary, residual carrier can be removed by heat setting as described in the preceding example.

The compounds of the invention can also be applied to polyester textile materials by the heat fixation technique described in U.S. Pat. No. 2,663,612 and in the American Dyestuff Reporter, 42, 1 (1953). The following procedure describes how the azo compounds of the invention can be applied to polyester materials by the heat fixation technique:

EXAMPLE 188

A mixture of 500 mg. of the compound of Example 10, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hrs. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring. A thickener and penetrating mixture is prepared by mixing 1 ml. of a complex diaryl sulfonate surfactant, (Compound 8-S),
3 ml. of a 3% solution of a sodium N-methyl-N-oleoyltaurate (Igepon T-Sl),
8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 min. The dye mixture is then filtered through cheesecloth to remove the stainless steel balls and added to the reservoir of a Butterworth padder where it is heated to about 45° to 60° C. 10 g. of a fabric of poly(ethylene terephthalate) fibers and 10 g. of a fabric of 65/35 spun poly(ethylene terephthalate)/cotton fibers are sewn together, end-to-end, and padded for 5 min. of continuous cycling through the dye mixture and between three rubber squeeze rollers of the padder. Dye mixture pick-up is about 60% based on the weight of the fabrics. The padded fabrics are dried at 200° F. and then heat-fixed for 2 min. at 415° F. in a forced air oven. The dyed fabrics are scoured for 20 min. at 65° to 70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and fastness to light and sublimation.

The heat fixation dyeing procedure described above can be varied by the substitution of other dispersing agents, surfactants, suspending agents, thickeners, etc. The temperature and time of the heat-fixation step can also be varied.

Fibers having a basis of a linear terephthalate polyester and sold under the trademarks "Kodel", "Dacron", "Fortrel", "Vycron" and "Terylene" are illustrative of the linear aromatic polyester textile materials that can be dyed with the novel azo compounds. Polyesters prepared from ethylene glycol and dimethylterephthalate and cyclohexanedimethanol and dimethylterephthalate are examples of such linear aromatic polyesters. Polyesters prepared from cyclohexanedimethanol and dimethylterephthalate are more particularly described in U.S. Pat. No. 2,901,466. Poly(ethylene terephthalate) polyester fibers are described, for example, in U.S. Pat. No. 2,465,319. The polymeric linear polyester materials disclosed in U.S. Pat. Nos. 2,945,010; 2,957,745 and 2,989,363, for example, can be dyed. The linear aromatic polyester materials specifically named have a melting point of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

The invention has been described in detail with particular reference to preferred embodiments thereof, but it will be understood that variations and modifications can be effected within the spirit and scope of the invention.

We claim:

1. A compound having the formula

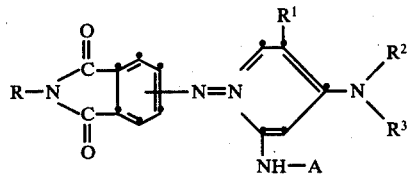

wherein

R and $R^2$ are the same or different and each is alkyl containing one to eight carbon atoms; cyclohexyl; cyclohexyl substituted with lower alkyl; arylmethyl; arylethyl; cyclohexylmethyl; 2-cyanoethyl or a group having the formula $-Z-R^9$ in which Z is ethylene, propylene, trimethylene or tetramethylene and $R^9$ is lower alkoxy, aryloxy, lower alkanoyloxy, lower alkoxycarbonyl, lower alkoxycarbonyloxy, aroyloxy or

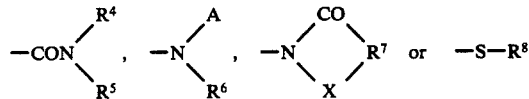

wherein $R^4$ individually is hydrogen, lower alkyl or aryl;
$R^5$ individually is hydrogen or lower alkyl;
$R^4$ and $R^5$ taken together are $-(CH_2)_5-$ or $-CH_2CH_2OCH_2CH_2-$;
$R^6$ is hydrogen, lower alkyl, aryl, or cyclohexyl;
$R^7$ is ethylene, propylene, trimethylene, o-cyclohexylene, or o-arylene;
X is $-CH_2-$, $-CO-$, or $-SO_2-$; and
$R^8$ is aryl, benzyl, cyclohexyl, 1,2,4-triazol-3-yl, or 2-benzothiazolyl;
A is lower alkanoyl; lower alkanoyl substituted with chlorine, bromine, aryl, cyano, lower alkoxy, benzyloxy, lower alkylthio, aryloxy or lower alkylsulfonyl; lower alkoxycarbonyl; or aroyl;
$R^1$ is hydrogen or methyl, one of $R^1$ and $R^3$ being hydrogen;
$R^3$ is hydrogen, lower alkyl, arylmethyl, arylethyl, allyl, aryl, or a group having the formula $-Z-R^{10}$ in which Z is ethylene, propylene, trimethylene, or tetramethylene and $R^{10}$ is lower alkoxy, aryloxy, lower alkanoyloxy, lower alkoxycarbonyl, or lower alkoxycarbonyloxy.

2. A compound according to claim 1 wherein R is lower alkyl; A is acetyl or propionyl; $R^1$ is hydrogen; $R^2$ is benzyl and $R^3$ is ethyl or propyl.

* * * * *

UNITED STATES PATENT OFFICE
CERTIFICATE OF CORRECTION

Patent No. 4,039,522  Dated August 2, 1977

Inventor(s) Max A. Weaver and Jean C. Fleischer

It is certified that error appears in the above-identified patent and that said Letters Patent are hereby corrected as shown below:

The title should read "Phthalimidyl-Azo-m-Acylamido-N-Substituted Aniline Compounds".

Columns 7 and 8, in the Table under Column "R", Examples 50 and 51, in each instance, "$-CH_2CH_2\overline{N(CH_2)_3CO}$" should read --- $-CH_2CH_2\overline{N(CH_2)_3CO}$ ---.

Columns 7 and 8, in the Table under Column "R", Example 57, "$-CH_2CH_2\overline{NCOCH_2CH_2C}$" should read --- $-CH_2CH_2\overline{NCOCH_2CH_2CO}$ ---.

Column 7 and 8, in the Table under Column "R", Example 61, "$-CH_2CH_2NcCH_3)SO_2CH_3$" should read --- $-CH_2CH_2N(CH_3)SO_2CH_3$ ---.

Columns 7 and 8, in the Table under Column "R", Examples 62 and 63, in each instance, "$-\overline{CHCH_2SO_2CH_2CH_2}$" should read --- $-\overline{CHCH_2SO_2CH_2CH_2}$ ---.

Columns 7 and 8, in the Table under Column "R", Example 69, "$CH_2CH_2\overline{NCO-o-C_6H_4SO_2}$" should read --- $-CH_2CH_2\overline{NCO-o-C_6H_4SO_2}$ ---.

Columns 7 and 8, in the Table under Column "$R^2$", Example 81, "$-C_2H_6$" should read --- $-C_2H_5$ ---.

Column 11, line 32, "hur" should read ---hr---.

Signed and Sealed this

Ninth Day of May 1978

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,039,522
DATED : August 2, 1977
INVENTOR(S) : Max A. Weaver and Jean C. Fleischer It is certified that error appears in the above-identified patent and that said Letters Patent are hereby corrected as shown below:

Column 1, lines 11-19, and Column 13, lines 31-39, in each instance the formula should read

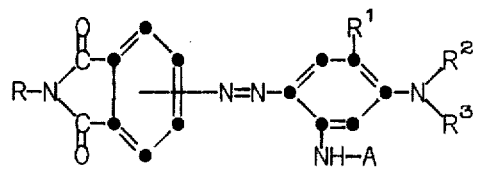

Signed and Sealed this

Twenty-seventh Day of February 1979

[SEAL]

Attest:

RUTH C. MASON
Attesting Officer

DONALD W. BANNER
Commissioner of Patents and Trademarks